Jan. 12, 1954   J. K. CLAPP ET AL   2,666,141
SINGLE SIDE BAND MIXER FOR MOVING
TARGET INDICATING RADAR SYSTEMS
Filed May 8, 1946
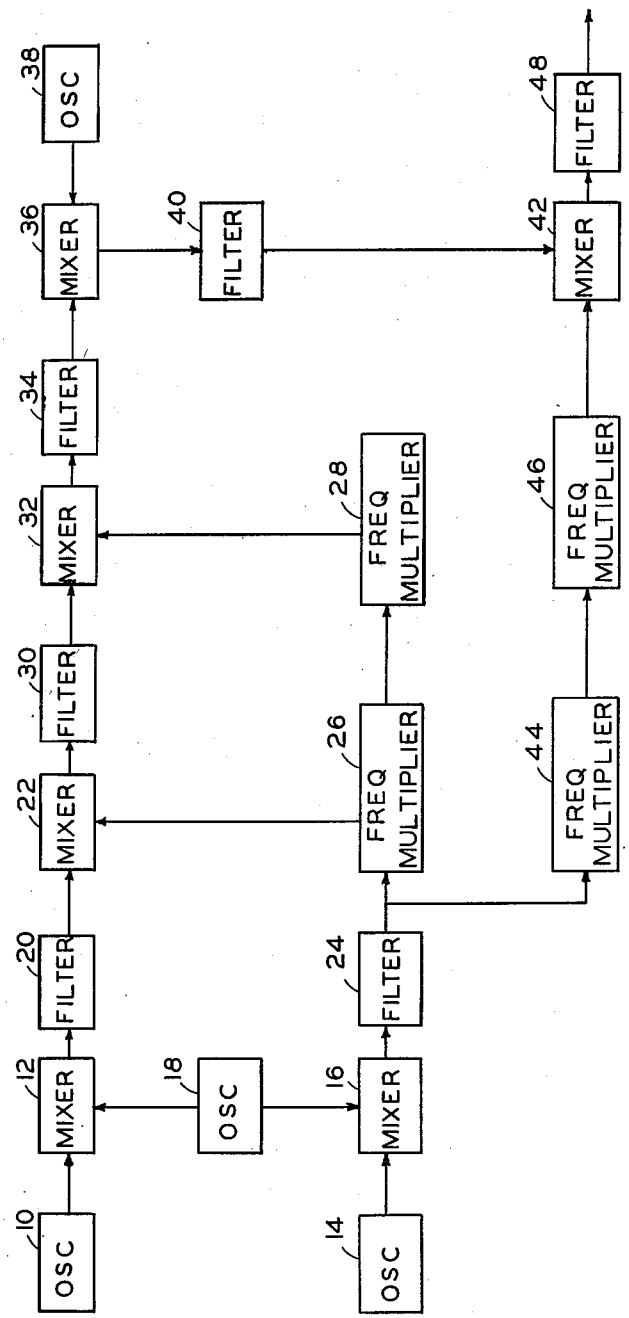
INVENTORS
JAMES K. CLAPP
CARL P. SPAULDING
BOB E. WATT
BY
William D. Hall.
ATTORNEY Patented Jan. 12, 1954

2,666,141

UNITED STATES PATENT OFFICE 2,666,141

SINGLE SIDE BAND MIXER FOR MOVING TARGET INDICATING RADAR SYSTEMS

James K. Clapp, Cambridge, Mass., Carl P. Spaulding, Pasadena, Calif., and Bob E. Watt, Houston, Tex.; said Watt and said Spaulding assignors, by mesne assignments, to the United States of America as represented by the Secretary of War Application May 8, 1946, Serial No. 668,182

4 Claims. (Cl. 250—36)

This invention relates to electrical apparatus and more particularly, to single side band radio frequency modulators.

In many applications of electronics, such as radio communications or in radio object locating systems, it is desirable to provide a signal the frequency of which is equal to the sum or difference of the frequencies of two signals. In conventional non-linear mixing circuits, when two signals are mixed, the output signal contains components having frequencies which are both the sum and difference of the frequencies of the input signals. In many applications, as for example in a communication system wherein it is desired to conserve power, it is desirable to eliminate signal components of one of the side band frequencies. This may be accomplished in a single side band modulator.

In the copending application of Bob E. Watt entitled Single Side Band Modulator, Serial No. 652,185, filed March 5, 1946, and now abandoned, a method is described and apparatus disclosed for eliminating the indications normally produced in a radar or radio object locating system by objects which have a predetermined velocity relative to the radar system. For example, the radar system may be located in an aircraft and cancellation provided for those objects which are stationary relative to the earth. The radar system is one which is adapted to normally give an indication of all objects which are moving relative to the aircraft. This feature is accomplished by utilizing a coherent reference oscillation which is fixed in phase relationship to the transmitted signal from the radar system. This coherent reference signal is combined in an algebraic manner with the echo signals returned by objects surrounding the system. Stationary objects will produce, upon combination with the reference signal, constant amplitude signals. Moving objects will produce, upon combination with the reference signal, variable amplitude signals. The signals which vary in amplitude are separated from the signals which do not vary in amplitude and the former utilized to provide the desired moving target indication. When it is desired to provide cancellation of signals returned by objects having a predetermined velocity relative to the radar system, the phase of the reference signal must be continuously and linearly varied as a function of time. In the cited copending application, this is achieved by altering the frequency of the coherent reference signal by an amount given by the equation $$(1) \qquad F = \frac{V_g \cos \delta}{\lambda \pi} + Nr$$

In the above equation: F is the cycles per unit time change in the frequency of the coherent reference signal; $V_g$ is the ground speed on the aircraft measured in the same time units as the quantity F; $\delta$ is the angle between the ground track of the aircraft and the pointing of the radar antenna when the antenna is pointing at the object whose returned signal is to be cancelled or eliminated; $\lambda$ is the wavelength of the coherent reference signal measured in the same units of distance as the quantity $V_g$; N is any integer including zero; and r is the repetition frequency of transmission from the radar system. The Nr in the above equation is usually included because the first term on the right hand side of the equation may have very small values even including zero, therefore, to permit adding signals of this frequency to a signal of another frequency, the first term on the right hand side of the equation is added to a carrier of frequency Nr.

One difficulty which is encountered in using the above equation for determining the frequency increment by which the coherent reference signal frequency is to be changed is that the equation includes the quantity r which, as hereinbefore stated, is the repetition frequency of transmission from the radar system. This requires that the transmission frequency be accurately known, and furthermore, that it be accurately controlled. It will be obvious that if the quantity r is determined, and if the quantity r then varies from the value used in the calculation, there will occur false or inaccurate indications of moving targets.

It is an object of the present invention, therefore, to provide a novel single side band modulator capable of producing a signal which may be used to provide cancellation of objects having a predetermined velocity relative to the moving target indication radar system wherein the cancellation is independent of the repetition frequency of the radar system.

It is a further object of the present invention to provide a novel single side band modulator capable of combining two signals, the ratio of the frequencies of which may be large.

For a better understanding of the invention, together with other and further objects thereof, reference is had to the following description which is to be read in connection with the accompanying drawing which illustrates in block diagram form one embodiment of the present invention.

In the drawing an oscillator 10, operating at a frequency denoted as $$(f'+F)$$

is connected to a signal mixer 12. The quantity F is given by the equation (1) in which the integer N equals zero. The quantity $f'$ may be any convenient value as, for example, 50,000 cycles per second. An oscillator 14, operating at a frequency denoted herein as $f'$, is connected to a signal mixer 16. An oscillator 18, operating at a frequency denoted herein as $f_1$ is electrically connected to the mixers 12 and 16. The frequency $f_1$ may, for example, be in the range of 50,000 or 60,000 cycles per second. The output of the mixer 12 is connected to a filter 20 and will contain signal components having frequencies $$f_1$$
$$(f'+F)$$
$$f_1+(f'+F)$$

and $$f_1-(f'+F)$$

The filter 20 is designed to pass either the upper or the lower side band components of the signal applied thereto. In the present instance, it will be assumed that the filter 20 is designed to pass the upper side band signal. The output of the filter 20, having a frequency $$f_1+(f'+F)$$

is applied to a mixer 22. The output of the mixer 16 is applied to a filter 24 and will have signal components having frequencies $$f'$$
$$f_1$$
$$(f_1+f')$$

and $$(f_1-f')$$

The filter 24 is designed to pass one of the side band components of the signal applied thereto, and in the present instance, it will be assumed that the filter 24 passes the upper side band frequency. The output of the filter 24, having a frequency $$(f_1+f')$$

is applied to a frequency multiplier 26. The frequency multiplier 26 may be any circuit well-known in the art capable of providing an output signal having a frequency which is a predetermined integral number of times as great as the frequency of the input signal. In the present apparatus, the frequency multiplier 26 is designed to multiply the input signal frequency by a factor of 6. The output of the frequency multiplier 26 having a frequency $$6(f_1+f')$$

is applied to the mixer 22 and to a frequency multiplier 28. The output of the mixer 22 is applied to a filter 30 and has signal components of frequencies $$f_1+(f'+F)$$
$$6(f_1+f')$$
$$6(f_1+f')+(f_1+(f'+F))=7(f_1+f')+F$$

and $$6(f_1+f')-(f_1+(f'+F))=5(f_1+f')-F$$

The filter 30 is designed to select one of the side band components of the signal applied thereto. In this instance, the filter 30 is designed to select the upper side band components. The output of the filter 30, having a frequency $$7(f_1+f')+F$$

is applied to a mixer 32. Also applied to the mixer 32 is a signal from the frequency multiplier 28. The frequency multiplier 28 is designed to provide an output signal the frequency of which is seven times the frequency of the input signal. The frequency of the signal from multiplier 28 which is applied to the mixer 32 is therefore $$42(f_1+f')$$

The output of the mixer 32 is applied to a filter 34 and contains signal components having frequencies $$7(f_1+f')+F$$
$$42(f_1+f')$$
$$42(f_1+f')+(7(f_1+f')+F)=49(f_1+f')+F$$

and $$42(f_1+f')-(7(f_1+f')+F)=35(f_1+f')-F$$

The filter 34 is designed to select one of the side band components of the signal applied thereto, which, in this instance, is the upper side band component. The output of the filter 34, having a frequency $$49(f_1+f')+F$$

is applied to a mixer 36. A second input to the mixer 36 is applied from an oscillator 38 operating at a frequency $f$. The oscillator 38 may be the source of the coherent reference oscillations hereinbefore mentioned, the frequency of which is to be altered by an amount F. The output of the mixer 36 is applied to a filter 40 and will contain signal components of frequencies $$49(f_1+f')+F$$
$$f$$
$$f+(49(f_1+f')+F)$$

and $$f-(49(f_1+f')+F)$$

The filter 40 is similar in function to the filters previously described and is herein assumed to select the upper side band frequency component. The output of the filter 40, having a frequency $$f+(49(f_1+f')+F)$$

is applied to a mixer 42. The output of the filter 24, having a frequency $$(f_1+f')$$

is applied to a frequency multiplier 44 which provides an output signal, the frequency of which is seven times the frequency of the input signal. The output of the frequency multiplier 44, having a frequency $$7(f_1+f')$$

is applied to a frequency multiplier 46 which again multiplies the frequency by a factor of 7. The output of the frequency multiplier 46, having a frequency $$49(f_1+f')$$

is applied to the mixer 42. The output of the mixer 42 is applied to a filter 48 and contains signal components of frequencies $f+(49(f_1+f')+F)$
$49(f_1+f')$
$(f+(49(f_1+f')+F))+(49(f_1+f'))=$
$\qquad f+98(f_1+f')+F$ and $(f+(49(f_1+f')+F))-(49(f_1+f'))=f+F$ The filter 48 is designed to select the lower side band component of the signal applied thereto, and the output of the filter 48 will, therefore, be $(f+F)$, which is a signal having the desired frequency.

The above description illustrates the manner in which a signal may be obtained, the frequency of which is the sum of the frequencies of two signals. If the quantity F is negative or if, for other reasons, it is desired to decrease the frequency of the signal from the oscillator 38 by an amount F, the filter 40 may be designed to pass the lower side band component instead of the upper side band component as herein specified. This change will also necessitate causing the filter 48 to select the upper side band component instead of the lower side band component as herein specified. It will be obvious that either the sum or the difference signal may be obtained at the filter 48 by other selections of the side band which the filters 20, 24, 30, and 34 are required to pass; therefore, this invention is not limited to the particular sequence of selection of side band components herein described.

While there has been described hereinabove what is at present considered to be a preferred embodiment of this invention, it will be obvious to those skilled in the art that various changes and modifications may be made therein without departing from the scope and spirit of the invention.

What is claimed is:

1. In a moving target indication radio object locating system having means for cancelling the indications from targets having a predetermined velocity, V, relative to said radio object locating system, apparatus providing a signal differing in frequency from the frequency of a coherent reference signal of wavelength $\lambda$ by an amount $F=V/\lambda\pi$, said apparatus comprising first, second, third and fourth signal sources, said first and second sources providing first and second signals differing in frequency by said amount F, said third source providing said coherent reference signal, said fourth source providing a signal of frequency comparable to the frequency of said first and second signals, first mixer means connected to said first and fourth sources providing a fifth signal differing in frequency from said fourth signal by an amount equal to the frequency of said first signal, second mixer means connected to said second and fourth sources providing a sixth signal differing in frequency from said fourth signal by an amount equal to the frequency of said second signal, first frequency multiplier means connected to said second mixer means providing a seventh signal of frequency equal to six times the frequency of said sixth signal, third mixer means connected to said first mixer means and said first frequency multiplier means providing an eighth signal differing in frequency from said seventh signal by an amount equal to the frequency of said fifth signal, second frequency multiplier means connected to said first frequency multiplier means providing a ninth signal of frequency equal to seven times the frequency of said seventh signal, fourth mixer means connected to said third mixer and said second frequency multiplier means providing a tenth signal differing in frequency from said ninth signal by an amount equal to the frequency of said eighth signal, fifth mixer means connected to said fourth mixer means and said third source providing an eleventh signal differing in frequency from said third signal by an amount equal to the frequency of said tenth signal, third frequency multiplier means connected to said second mixer means providing a twelfth signal of frequency equal to seven times the frequency of said sixth signal, fourth frequency multiplier means connected to said third frequency multiplier means providing a thirteenth signal of frequency equal to seven times the frequency of said twelfth signal, and sixth mixer means connected to said fifth mixer means and said fourth frequency multiplier means providing a fourteenth signal differing in frequency from said eleventh signal by an amount equal to the frequency of said thirteenth signal whereby said fourteenth signal differs in frequency from said third signal by said amount F.

2. A single side band mixer for mixing a carrier frequency signal with a given signal having a frequency which is extremely low relative to the carrier frequency signal, said single side band mixer comprising a first low frequency signal source fixed in frequency, a second low frequency signal source differing in frequency from the frequency of said first source by an amount equal to the frequency of said given signal, a first means connected to said first and second sources providing a third signal comparable in frequency to the frequency of said carrier signal and having a frequency equal to $n$ times the frequency of said first signal plus the frequency of said given signal, wherein $n$ is any integer, a second means connected to said first means providing a fourth signal differing in frequency from said carrier signal by an amount equal to the frequency of said third signal, a third means connected to said first source providing a fifth signal comparable in frequency to the frequency of said carrier signal and having a frequency equal to $n$ times the frequency of said first signal, and mixer means connected to said second and third means combining said fourth and fifth signals and providing therefrom a signal differing in frequency from the frequency of said carrier signal by an amount equal to the frequency of said given signal.

3. Apparatus for changing the frequency of a first signal by an amount equal to the frequency of a given signal, comprising generating means for generating both a second signal whose frequency is substantially lower than said first signal and for generating a third signal whose frequency differs from said second signal by an amount equal to the frequency of said given signal, first frequency multiplying means having said second signal applied thereto for providing a fourth signal having a frequency equal to $n$ times the frequency of said second signal, wherein $n$ is any integer greater than unity, first mixing means having said third and fourth signals applied thereto for providing a fifth signal whose frequency differs from said fourth signal by the frequency of said third signal, second mixing means having said first and fifth signals applied thereto for providing a sixth signal differing in frequency from said first signal by an amount equal to said fifth signal, second frequency multiplying means having said second signal applied thereto for providing a seventh signal whose frequency differs from the frequency of said fourth signal by said second signal, and third mixing means having said sixth and seventh signals applied thereto, and a filter coupled to said third mixing means for deriving a single frequency signal whose frequency differs from said first signal by said given signal.

4. Apparatus according to claim 3, wherein said generating means includes a first oscillator means for generating an eighth signal whose frequency is approximately half the frequency of said second signal, a second oscillator means for generating a ninth signal whose frequency differs from the frequency of said first oscillator means by said given frequency, a third oscillator means for generating a tenth signal whose frequency is approximately half the frequency of said second signal, fourth mixing means having said eighth and tenth signals applied thereto for producing a signal whose frequency is equal to said second signal, and fifth mixing means having said ninth and tenth signals applied thereto for producing said third signal.

JAMES K. CLAPP.
CARL P. SPAULDING.
BOB E. WATT.

References Cited in the file of this patent

UNITED STATES PATENTS

| Number | Name | Date |
|---|---|---|
| 1,919,803 | Roetken | July 25, 1933 |
| 2,228,815 | Deerhake | Jan. 14, 1941 |
| 2,407,213 | Tunick | Sept. 3, 1946 |

FOREIGN PATENTS

| Number | Country | Date |
|---|---|---|
| 486,448 | Great Britain | June 2, 1938 |